United States Patent [19]

Ohta et al.

[11] 3,876,938

[45] Apr. 8, 1975

[54] MAGNETIC SWITCH FOR A PULSE GENERATOR, RECEIVER, AND TRANSDUCER

[75] Inventors: Hiroshi Ohta, Tokyo; Yukio Sudo, Sagamihara, both of Japan

[73] Assignee: Kabushikikaisha Tokyo Keiki (Tokyo Keiki Co., Ltd.), Tokyo, Japan

[22] Filed: June 18, 1973

[21] Appl. No.: 370,641

[30] Foreign Application Priority Data
June 19, 1972  Japan.............................. 48-61081
May 28, 1973  Japan.............................. 47-59540

[52] U.S. Cl..................................... 325/22; 340/3
[51] Int. Cl. ........................................ H04b 1/40
[58] Field of Search ........................... 325/21–24; 343/175, 180; 333/13; 340/3 R, 3 A, 174 AG; 307/88 R

[56] References Cited
UNITED STATES PATENTS

| 2,969,523 | 1/1961 | Kelley .......................... 340/174 AG |
| 3,117,241 | 1/1964 | Paynter et al...................... 340/3 R |
| 3,373,360 | 12/1968 | Wilson ........................... 343/180 X |
| 3,414,872 | 12/1968 | Barron ............................. 325/22 X |
| 3,524,991 | 8/1970 | Peslier............................. 307/88 R |
| 3,541,346 | 11/1970 | Paine .............................. 307/88 R |

Primary Examiner—Robert L. Griffin
Assistant Examiner—Aristotelis M. Psitos
Attorney, Agent, or Firm—Hill, Gross, Simpson, Van Santen, Steadman, Chiara & Simpson

[57] ABSTRACT

A duplexer for an apparatus, in which a pulse generator, a transducer and a receiver are provided, having a magnetic switching device disposed between the transducer and the receiver.

16 Claims, 6 Drawing Figures

MAGNETIC SWITCH FOR A PULSE GENERATOR, RECEIVER, AND TRANSDUCER

BACKGROUND OF THE INVENTION

1. Field of the Invention

The present invention relates in general to a duplexer, and in particular to a duplexer for a radio transmitter-receiver, an ultrasonic flaw detector and an ultrasonic fish detector, in which the transmission and reception of signals are alternately carried out and an antenna for signal transmission and reception and a vibrator or transducer for signal transmission and reception is used commonly.

2. Description of the Prior Art

A conventional ultrasonic flaw detector has a defect in that the receiver can be damaged by a high voltage pulse which reaches the receiver directly or through an object to be detected.

Another type of a conventional type of a conventional ultrasonic flaw detector has been proposed so as to avoid the defect encountered in the first mentioned detector, which comprises an input circuit. According to the second detector, however, there may be introduced another drawback in that the S/N ratio is lowered and hence small flaws can not be detected.

SUMMARY OF THE INVENTION

It is an object of the present invention to provide a duplexer for use in an ultrasonic flaw detector and so on free from the defects encountered in the prior art.

It is another object of the present invention to provide a duplexer which can positively isolate signal transmission between a transducer and a receiver.

DESCRIPTION OF THE PREFERRED EMBODIMENTS

Before describing the present invention, prior art ultrasonic flaw detectors will be now described with reference to FIGS. 1 and 2.

Figure 1:
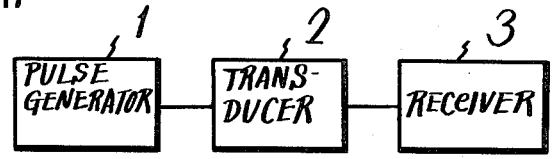
FIG. 1 is a block diagram for showing a prior art ultrasonic flaw detector.

FIG. 1 shows a conventional ultrasonic flaw detector in which a transmission pulse of high voltage is fed from a pulse generator 1 to an ultrasonic vibrator transducer 2 for both signal transmission and reception or signal transmission only. When the transducer 2 is supplied with the pulse from the generator 1, it produces an ultrasonic wave beam to a target or object (not shown) to be detected. The reflected ultrasonic beams or echo beams by the object and/or flaws thereon, if any, are received by the transducer 2 and converted to corresponding electrical signals which are fed to a receiver 3.

With the ultrasonic flaw detector shown in FIG. 1, when the transmission pulse of high voltage is applied from the pulse generator 1 to the transducer 2 for both signal transmission and reception or signal transmission only, the transmission pulse of high voltage is fed from the transducer 2 for signal transmission and reception to the receiver 3 directly, or from the transducer 2 for signal transmission to the receiver 3 through the object to be detected and the transducer 2 for signal reception. As a result, the receiver may be damaged.

Figure 2:
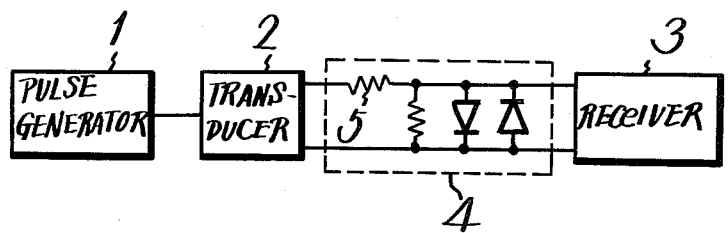
FIG. 2 is a block diagram for showing another example of a prior art ultrasonic flaw detector.

FIG. 2 shows another type of a prior art ultrasonic flaw detector in which reference numerals same as those of FIG. 1 designate same elements. In the embodiment of FIG. 2, an imput circuit 4 which consists of resistors and diodes is connected between the transducer 2 for both signal transmission and reception or signal reception only and the receiver 3 for protecting the latter.

With the embodiment shown in FIG. 2, when a signal which may be detected by the transducer 2 is fed to the receiver 3, the signal is greatly attenuated by a resistor 5 of the input circuit 4 for preventing high voltage from passing therethrough and consequently the resistor 5 causes deterioration of the S/N ratio of the received signal, so that small flaws are not detected.

An embodiment of the invention will be now described with reference to FIG. 3 in which reference numerals same as thos of FIGS. 1 and 2 indicate the elements.

Figure 3:
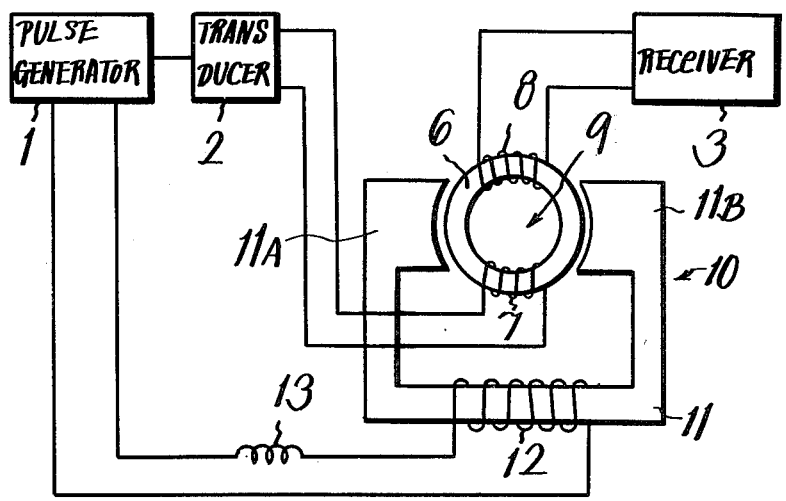
FIG. 3 is a schematic diagram for showing an embodiment of the present invention.

In the invention shown in FIG. 3, an annular core 6 made of magnetic material, by way of example, is provided on which a primary coil 7 and a secondary coil 8 of a coupling transformer 9 are wound, respectively. The primary coil 7 is connected to the transducer 2 for both signal transmission and reception or only for signal recption, while the secondary coil 8 is connected to the receiver 3 at its input side. In this case, the ratio of number of turns of the coils 7 and 8 is selected to make the noise index of the receiver 3 optimum. An exciting device 10 is provided which consists of, for example, a core 11 made of magnetic material and an exciting coil 12 wound on the core 11. The core 11 is formed to be substantially U-shaped and both legs 11A and 11B grip the core 6 therebetween. The coil 12 is connected to the pulse generator 1 at its output side. Reference numeral 13 is a choke coil connected in series to the exciting coil 12 for preventing the energy in the primary coil 7 of the transformer 9 from being coupled to the exciting coil 12 of the exciting device 10.

The operation of the embodiment shown in FIG. 3 will be now described. When the generator 1 supplies the transmission pulse signal to transducer 2 for both signal transmission and reception or for only signal transmission, this transmission pulse is also supplied to the exciting coil 12. Accordingly, the magnetic flux is produced through the core 11 to magnetically saturate the core 6 of the transformer 9 completely by the current flowing through the coil 12 and hence the magnetic permeability of the core 6 is lowered to be about one one-hundredth of that when no current flows throught the coil 12. As a result, the degree of coupling of the transformer 9 becomes substantially zero. For this reason, the transmission pulse of high voltage, which is fed to the transducer 2 for both signal transmission and reception or only for signal transmission through the object to be detected, is not supplied to the receiver 3 through the transformer 9, so that the receiver 3 is prevented from being damaged.

When application of the transmission pulse to the transducer 2 from the generator 1 is discontinued, the coil 12 no longer receives the pulse from the generator 1 with the result that no magnetic flux is generated in the core 11 and hence the annular core 6 of the transformer 9 is not saturated and acts as a normal coupling transformer. Accordingly, in such a state, the ultrasonic wave emitted from the transducer 2, is reflected by the object to be detected and its flaw, if any, and then received by the transducer 2 and is converted to the corresponding electrical signal which is then fed to the receiver 3. At this time, no attenuation occurs in the received signal and no noise is produced, and lowering of the S/N ratio is prevented in the received signal and hence small flaws can be detected positively.

A second embodiment of the invention will be now described with reference to FIG. 4 in which the same reference numerals as those of FIGS. 1 to 3 indicate the same elements.

Figure 4:
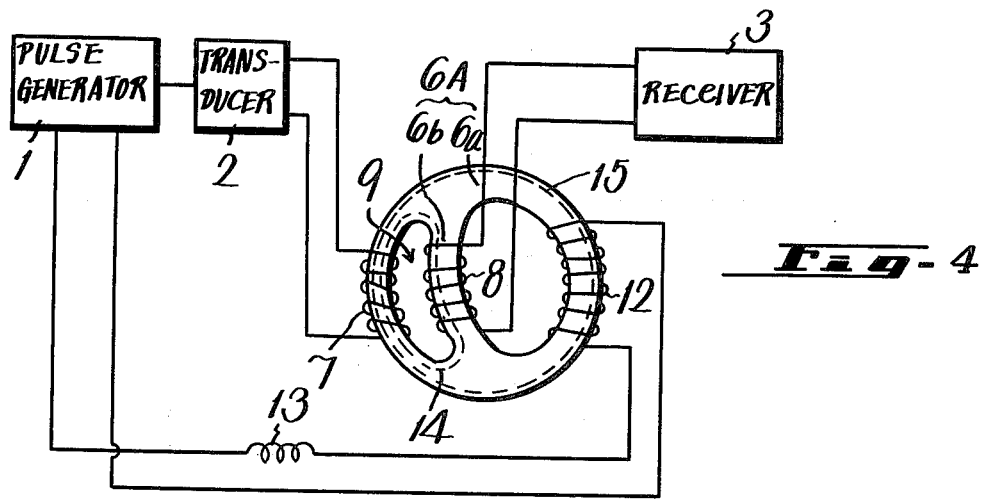
FIGS. 4 to 6, inclusive, are respectively schematic diagrams for showing other embodiments of the present invention.

In the embodiment of FIG. 4, the cores 6 and 11 in the embodiment of FIG. 3 are combined as a core 6A to reduce the size of the device. That is, the core 6A is formed of an annular core member 6a and a rod-shaped core member 6b which are connected such that first and second closed magnetic paths 14 and 15 are formed as shown by dotted lines in FIG. 4. In this case, the closed magnetic paths 14 and 15 partially overlap. In the embodiment of FIG. 4, the primary coil 7 of the transformer 9 is wound on the part of the annular core member 6a where the magnetic paths 14 and 15 overlap, and, the secondary coil 8 of the transformer 9 is wound on the rod-shaped core member 6b through which only the magnetic path 14 passes, and the exciting coil 12 is wound on the part of the annular core member 6a where only the magnetic path 15 passes. The other connections are substantially the same as those of the embodiment shown in FIG. 3.

With the embodiment of FIG. 4, when the transmission pulse of high voltage is supplied to the exciting coil 12 from the pulse generator 1, the annular closed magnetic path 15 is rendered substantially saturated and hence the first closed magnetic path 14 is substantially saturated also to thereby make the degree of coupling of the transformer 9 approximately zero. When no pulse signal is applied to the coil 12, the transformer 9 acts as a normal coupling transformer. Therefore, it will be apparent that the embodiment of FIG. 4 is substantially the same in operation and effect as the embodiment of FIG. 4 is substantially the same in operation and effect as the embodiment of FIG. 3, but it is smaller.

A third embodiment of the present invention will be now described with reference to FIG. 5 in which reference numerals the same as those of the foregoing figures designate the same elements and their description is omitted for the sake of simplicity.

Figure 5:
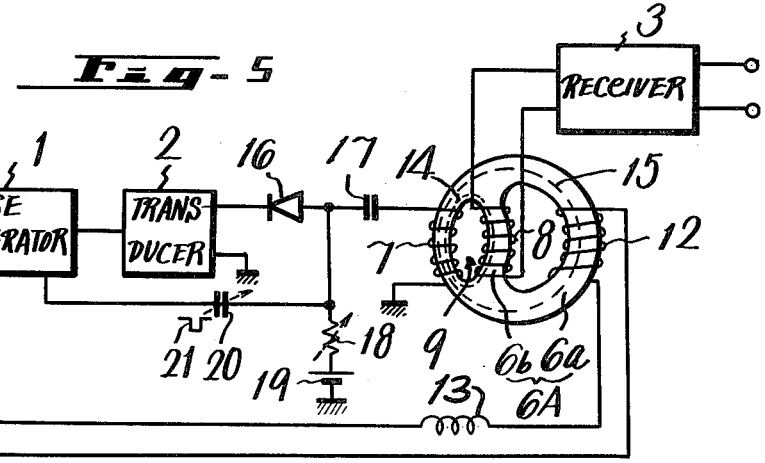

In the embodiment of FIG. 5, a series connection of a semiconductor diode 16 such as a PIN diode and a capacitor 17 is inserted between one of the output terminals of the transducer 2 and one end of the primary coil 7 of the transformer 9; a series connection of a variable resistor 18 and a DC power source 19 is connected between the connection point of the diode 16 and the capacitor 17 and earth for biasing the diode 16 in the forward direction; and a capacitor 20 is connected between one of the output terminals of the pulse generator 1 and the connection point of the above mentioned first and second series circuits. The other circuit construction is substantailly the same as that of FIGS. 3 and 4.

With the embodiment shown in FIG. 5, at the time of signal transmission, the pulse signal 21 is fed from the pulse generator 1 to the coil 12 through the choke coil 13, to the diode 16 through the capacitor 20 and to the transducer 2, respectively. Accordingly, the transducer 2 is energized to emit an ultrasonic wave beam to the object to be detected. At the same time, from the transducer 2 a pulse signal of high voltage which is caused by the vibration of the transducer 2, is fed to the diode 16. However, the diode 16 is supplied through the capacitor 20 with the negative pulse 21, which is much higher than the bias voltage from the DC source 19, so that the diode 16 is biased in the reverse direction to be substantially non-conductive. As a result, at the time of signal transmission, a large amount of the energy from the transducer 2 is prevented by the diode 16 from being passed therethrough to the primary coil 7 of the transformer 9 and hence a very small amount of the energy is transmitted to the primary coil 7 of the transformer 9. At this time, the exciting coil 12 wound on the core 6A is supplied with the pulse signal from the pulse generator 1 to saturate the magnetic paths 14 and 15 on which the primary and secondary coils 7 and 8 of the transformer 9 are wound, so that the degree of coupling of the coils 7 and 8 of the transformer 9 is reduced to a value less than the normal state of the transformer 9 by several hundred times. Therefore, even if the output from the transducer 2 is transmitted to the primary coil 7 of the transformer 9 through the diode 16, which is biased reversely, and the capacitor 17, no voltaged is induced in the secondary coil 8 of the transformer 9 and hence no signal is fed to the receiver 3 during signal transmission.

Other on the other hand, when the pulse generator 1 delivers no pulse signal and hence the transducer 2 is in the state for receiving a signal, the diode 16 is supplied with the forward bias only from the DC source 19 and is conductive and hence the voltage generated by the transducer 2, which receives the reflected ultrasonic wave from the object to be detected, is transmitted to the primary coil 7 of the transformer 9 through the diode 16 and the capacitor 17. During signal reception, the exciting winding 12 is not supplied with the pulse signal from the pulse generator 1, so that the transformer 9 acts normally. Therefore, upon signal reception, a voltage is induced at the secondary coil 8 in response to that applied to the primary winding 7 and hence is fed to the receiver 3 to carry out normal signal reception.

The ultrasonic wave emitted from the transducer 2 at signal transmission is reflected on the object to be detected and then is received by the transducer 2 and is converted to the corresponding electrical signal which is then fed to the receiver 3. At this time, the echo signal received by the transducer 2 contains the necessary signal and clutter components which change in intensity in accordance with $R^{-4}$ (or $T^{-4}$) where $R$ is the distance between the transducer 2 and the object and is the $T$ travel time of the signal through the distance $R$). Accordingly, if the object to be detected is located near the transducer 2, the signal received by the transducer 2 is very high in intensity, the signal fed to the receiver 3 is great enough to saturate the receiver 3, so that it is difficult to distinguish the desired signal from the clutter. For this reason, in the prior art the receiver 3 is biased to make its sensitivity reversely proportional to $R^{-4}$ (or $T^{-4}$). This has been referred to as "time-sensitivity-adjustment."

A further embodiment of the invention, in which the time-sensitivity-adjustment is achieved outside the receiver 3, will be now described with reference to FIG. 6 in which reference numerals the same as those of the foregoing figures show the same elements and their description will be omitted for the sake of brevity.

Figure 6:
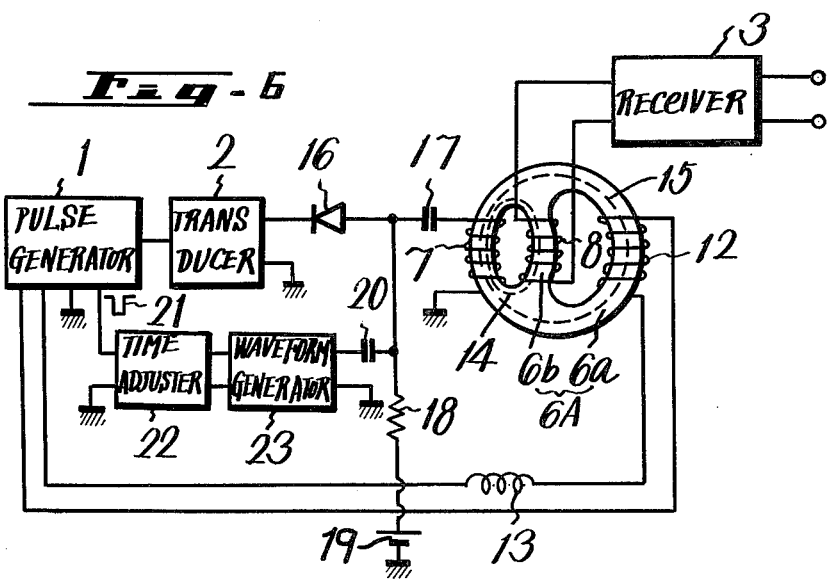

In the embodiment of FIG. 6, a series connection of a time adjuster 22 and a waveform generator 23 is connected between the first pulse generator 1 and the capacitor 20. The other circuit construction is substantially the same as that of FIG. 5.

With the embodiment of FIG. 6, the pulse signal 21 from the pulse generator 1 is supplied to the time adjuster 22. The time adjuster 22 delays or advances the signal applied thereto with respect to its generation (or the pulse signal 21 is subject to a so-called time adjustment), if desired, and then the pulse signal is applied from the time adjuster 22 to the waveform generator 23. Thus, the waveform generator 23 produces a pulse signal with a suitable waveform which is applied to the diode 16 through the capacitor 20 in addition to the bias voltage from the DC source 19. Accordingly, the conduction or non-conduction of the diode 16 can be controlled to perform the time-sensitivity-adjustment. In other words, in the embodiment of FIG. 6, the time-sensitivity-adjustment is achieved by controlling the conduction of the diode 16 connected between the transducer 2 and the primary coil 7 of the transformer 9 which are located outside the receiver 3.

In the embodiment of FIG. 6, the time-sensitivity-adjustment is carried out by the provision of the time adjuster 22 and the waveform generator 23. However, the same effect can be attained by the embodiment shown in FIG. 5, if the resistor 18 and the capacitor 20 are made variable as shown in FIG. 6 by dotted lines, respectively. That is, the time-sensitivity-adjustment is achieved by changing the resistance value of the resistor 18 and the capacitance value of the capacitor 20 to vary the time constant of the bias applied to the diode 16.

The embodiments of the invention exemplified as above are applied to the ultrasonic flaw detector, but it will be apparent that the present invention can be applied to a radio system if signal transmission and signal reception are integrated therein. In this case, it is assumed that the pulse generator 1, transducer 2 and the receiver 3 are a transmitter, an antenna and a receiver, respectively, but the other circuit constructions are substantially the same as that of the foregoing embodiments.

With the present invention described as above, in an apparatus which requires signal transmission and signal reception, transmission signal is positively prevented from being transmitted to a receiver at signal transmission, while, at signal reception, signal is positively received by the receiver without loss even if the signal is feeble and undesirable signal will not be transmitted to the receiver.

It will be apparent that many changes and variations may be effected without apparting from the spirits and scope of the novel concepts of the present invention.

We claim as our invention:

1. A switching circuit for automatically isolating a receiver from a transmitter pulse generator when the pulse generator is energized comprising a transducer connected to receive the output of said pulse generator and to radiate it and to receive echoes, a generally annular-shaped first magnetic core means with a pair of windings wound thereon and with the first of said windings connected to the output of said transducer, a receiver connected to the other of said pair of windings, second magnetic core means magnetically coupled to said first magnetic core means, a third winding wound on said second magnetic core means and connected to the output of said pulse generator such that the magnetic coupling between said first and second windings is varied when said third winding is energized.

2. A switching circuit according to claim 1 wherein said second magnetic core means is generally C-shaped with opposed legs and said first core means mounted between said opposed legs.

3. A switching circuit according to claim 1 including a choke coil mounted in series with said third winding.

4. A switching circuit according to claim 1 wherein said first and second magnetic core means are integrally formed such that said third winding when energized can effectively decouple said first and second windings.

5. A switching circuit according to claim 4 including a diode and a first capacitor connected between said transducer and said first winding and means for controlling conduction of said diode connected to said pulse generator so that diode blocks current between said transducer and said first winding when said pulse generator is energized.

6. A switching circuit according to claim 5 wherein said means for controlling conduction comprises a second capacitor connected between said pulse generator and the connection point between said diode and first capacitor, and a bias voltage source connected between ground and said connection point.

7. A switching circuit according to claim 6 wherein said second capacitor is variable.

8. A switching circuit according to claim 7 including a resistor connected in series with said voltage source and ground.

9. A switching circuit according to claim 8 wherein said resistor is variable.

10. A switching circuit according to claim 6 including a time adjuster and a wave form generator connected in series between said pulse generator and said second capacitor and said time adjuster delays the signal from said pulse generator and controls the wave form generator such that it supplies a bias signal to the diode which varies as a time function to provide time sensitivity adjustment.

11. An ultrasonic duplexer for an apparatus comprising:
   a. a pulse generator;
   b. a transducer connected to said pulse generator;
   c. a magnetic switching device consisting of a magnetic core, a first coil wound thereon and a second coil wound also thereon which form a transformer, said first coil being connected to said transducer;
   d. a receiver connected to said second coil of said transformer;
   e. a second core located in association with said first core and having wound thereon a third coil which is connected to said pulse generator to control said transformer;
   f. a diode switching device connected between said transducer and said first coil;

g. means connected in association with said pulse generator and said diode switching device for controlling the conduction of said diode switching device; and h. a resistor connected in association with said diode switching device.

12. An ultrasonic duplexer according to claim 11 in which said controlling means includes a DC voltage source and a capacitor which is supplied with the pulse from the pulse generator.

13. An ultrasonic duplexer according to claim 12 in which said capacitor is made variable to change the time constant of said controlling means.

14. An ultrasonic duplexer according to claim 12 in which said resistor is made variable to change the time constant of said controlling means.

15. An ultrasonic duplexer according to claim 12 in which said controlling means further includes a second means for controlling the conduction state and conduction time of said diode switching device.

16. An ultrasonic duplexer according to claim 15 in which said second means consists of a time adjuster and a wave form generator connected between said pulse generator and capacitor.

* * * * *